US010828600B1

(12) United States Patent
Vitse

(10) Patent No.: US 10,828,600 B1
(45) Date of Patent: Nov. 10, 2020

(54) SYSTEM AND METHOD FOR REMOVING SULFUR TRIOXIDE FROM A FLUE GAS

(71) Applicant: GENERAL ELECTRIC COMPANY, Schenectady, NY (US)

(72) Inventor: Frederic Vitse, West Hartford, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/533,200

(22) Filed: Aug. 6, 2019

(51) Int. Cl.
*B01D 53/34* (2006.01)
*B01D 53/50* (2006.01)
*B01D 53/76* (2006.01)

(52) U.S. Cl.
CPC ........... *B01D 53/50* (2013.01); *B01D 53/346* (2013.01); *B01D 53/76* (2013.01); *B01D 2251/21* (2013.01); *B01D 2251/304* (2013.01); *B01D 2251/306* (2013.01); *B01D 2257/302* (2013.01); *B01D 2258/0283* (2013.01)

(58) Field of Classification Search
CPC .... B01D 53/1481; B01D 53/50; B01D 53/76; B01D 2251/30; B01D 2251/40; B01D 2257/302; B01D 2258/0283; B01D 2259/10; B01D 2259/122; B01J 12/00
See application file for complete search history.

(56) References Cited

U.S. PATENT DOCUMENTS

| 4,115,518 A * | 9/1978 | Delmon | B01D 53/1493 423/244.08 |
| 4,753,785 A * | 6/1988 | Kisters | B01D 53/68 423/240 R |
| 5,401,480 A * | 3/1995 | Johnson | B01D 53/501 423/243.06 |
| 9,649,594 B2 | 5/2017 | Cohen et al. | |

OTHER PUBLICATIONS

Xie et al., "Sulfur trioxide removal performance of alkaline sorbents injection in the temperature range 400-705 degrees Celsius: a pilot-scale study", Journal of Chemical Technology & Biotechnology, 2019, published online in Wiley Online Library: wileyonlinelibrary. com DOI 10.1002/jctb.6046.

* cited by examiner

*Primary Examiner* — Timothy C Vanoy
(74) *Attorney, Agent, or Firm* — Grogan, Tuccillo & Vanderleeden, LLP

(57) ABSTRACT

A system for removing $SO_3$ from a flue gas is provided. The system includes a conduit and an injector. The conduit is operative to define a flow path of the flue gas. The injector is operative to inject at least one gaseous state alkali-containing species into the conduit at an injection point. The temperature of the flue gas at the injection point is above the condensation temperature of sulfuric acid.

18 Claims, 2 Drawing Sheets

SYSTEM AND METHOD FOR REMOVING SULFUR TRIOXIDE FROM A FLUE GAS

BACKGROUND

Technical Field

Figure 1:
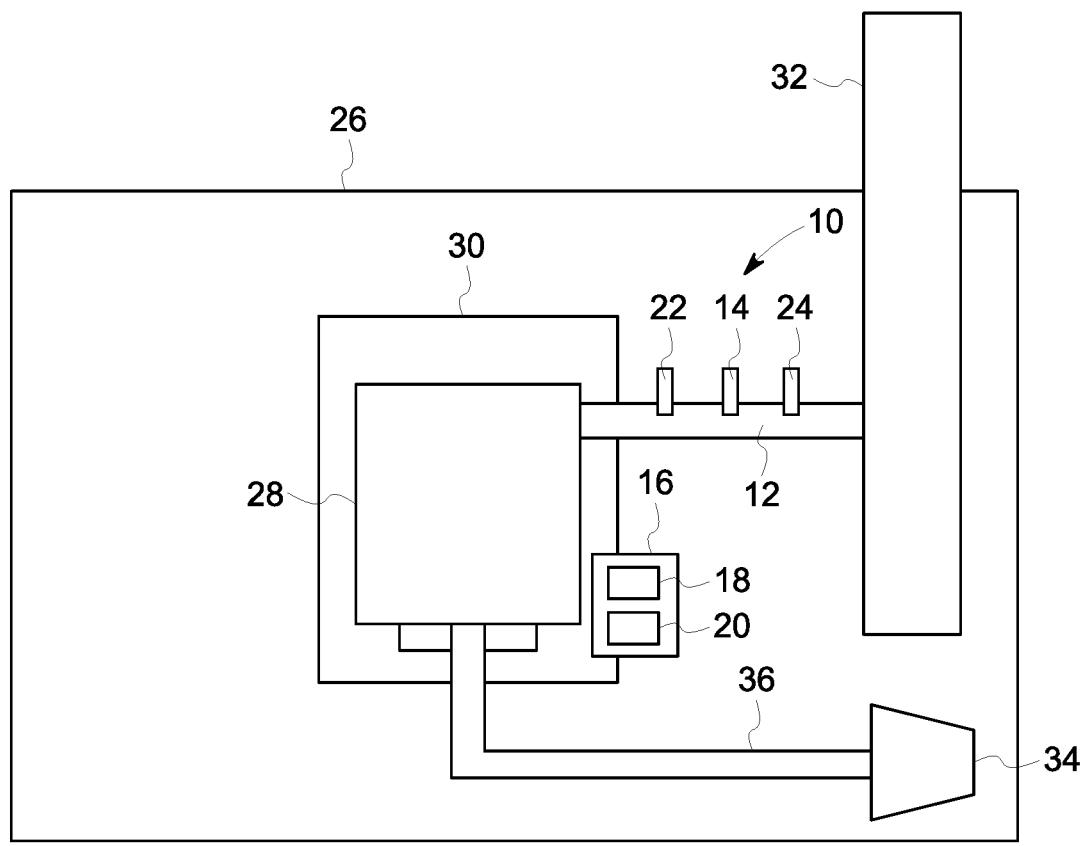

Embodiments of the invention relate generally to energy production, and more specifically, to a system and method for removing sulfur trioxide ("$SO_3$") from a flue gas.

Discussion of Art

Many power plants generate electrical power via combusting/burning a fuel to generate steam for driving a steam turbine, which in turn powers a generator. Many such power plants burn coal and/or other fossil fuels. Burning fossil fuels, however, typically generates a flue gas containing pollutants such as such as $CO_2(g)$, $SO_2(g)$ and $SO_3(g)$. Emissions of $SO_3(g)$ are particularly problematic as it is corrosive and is presently believed to contribute to Acid Rain. Further, $SO_3(g)$ may result in corrosion of conduits and/or equipment within a power plant, thus increasing a plant's maintenance cost. Further still, as a flue gas cools down, $SO_3(g)$ can react with other chemicals within the flue gas to form sulfuric acid, which is highly corrosive.

Presently, $SO_3$ removal cannot be fully achieved within a combustion chamber due to $SO_2$ catalytic oxidation in the flue gas as the flue gas cools down. While several technologies exist for removing/capturing $SO_3(g)$ within a flue gas downstream of a combustion chamber, they often suffer from undesirable side effects.

For example, technologies exist for removing/capturing $SO_3(g)$ from a flue gas via injecting a dry solid sorbent into the flue gas prior to the condensation point of sulfuric acid. Such technologies, however, are often inefficient as they fail to specifically target $SO_3(g)$, with most of the sorbet consumed by the inadvertent removal of $SO_2(g)$.

Other technologies for removing/capturing $SO_3$ involve facilitating phase changes. For example, ammonia can be injected into a flue gas to facilitate the condensation of ammonium bisulfate. However, the corresponding reactions occur at low temperatures which usually results in the formation of sticky deposits in conduit(s) or other equipment downstream of the ammonium injection site. As will be appreciated, the accumulation of sticky deposits often leads to corrosion, fouling and/or plugging of the conduit(s) or equipment.

What is needed, therefore, is an improved system and method for removing $SO_3$ from a flue gas.

BRIEF DESCRIPTION

In an embodiment, a system for removing $SO_3$ from a flue gas is provided. The system includes a conduit and an injector. The conduit is operative to define a flow path of the flue gas. The injector is operative to inject at least one gaseous state alkali-containing species into the conduit at an injection point. The temperature of the flue gas at the injection point is above the condensation temperature of sulfuric acid.

In another embodiment, a method for removing $SO_3$ from a flue gas is provided. The method includes injecting at least one gaseous state alkali-containing species into a flow path of a flue gas at an injection point upstream of a region of the flow path where sulfuric acid condenses out of the flue gas.

In yet another embodiment, a non-transitory computer readable medium comprising instructions is provided. The instructions adapt at least one processor to: inject, via an injector, at least one gaseous state alkali-containing species into a conduit defining a flow path of a flue gas at an injection point upstream of a region of the flow path where sulfuric acid condenses out of the flue gas.

DRAWINGS

Figure 2:
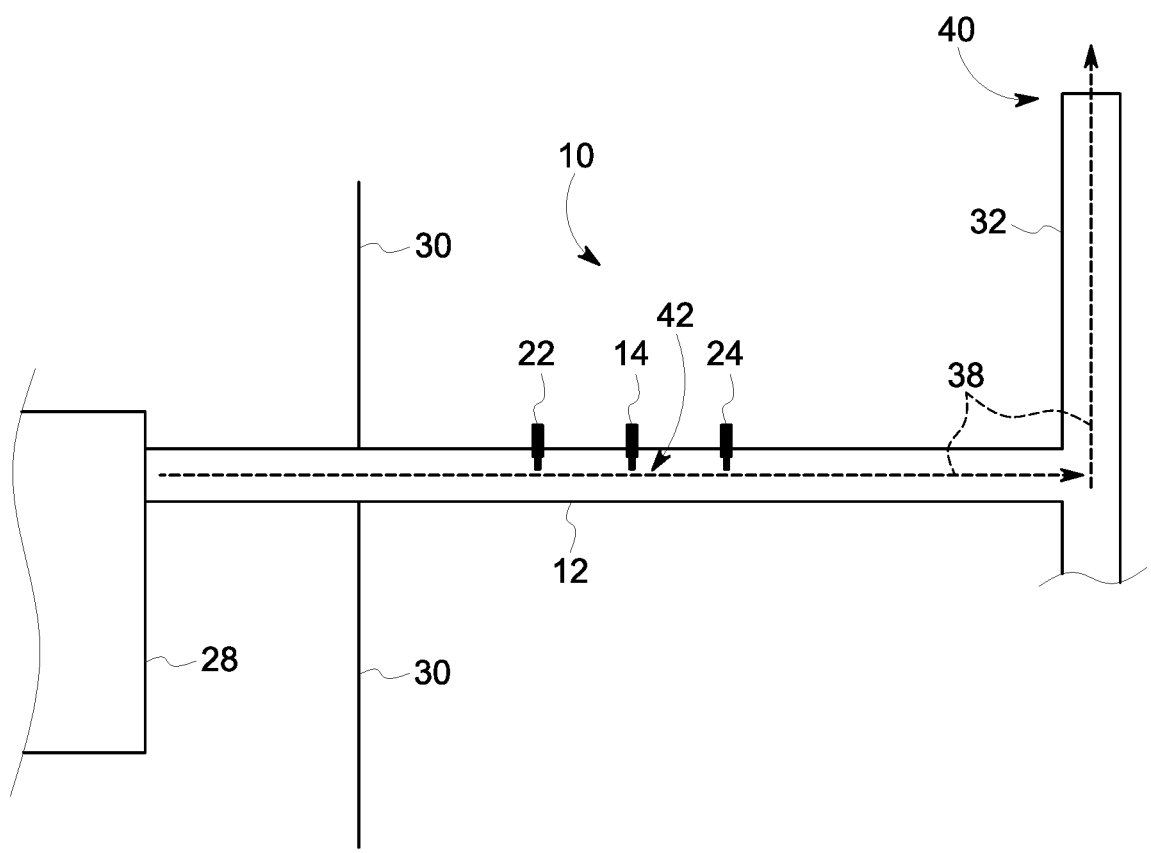

The present invention will be better understood from reading the following description of non-limiting embodiments, with reference to the attached drawings, wherein below:

FIG. 1 is a block diagram of a system for removing $SO_3$ from a flue gas, in accordance with an embodiment of the present invention; and FIG. 2 is another block diagram of the system of FIG. 1, in accordance with an embodiment of the present invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. The term "real-time," as used herein, means a level of processing responsiveness that a user senses as sufficiently immediate or that enables the processor to keep up with an external process. As used herein, "electrically coupled," "electrically connected," and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid and/or gas flowing between and/or near the referenced elements. Further, the term "stream," as used herein with respect to particles, means a continuous or near continuous flow of particles. As also used herein, the term "heating contact" means that the referenced objects are in proximity of one another such that heat/thermal energy can transfer between them. The term "seed particle", as used herein, refers to a substance that facilitates the condensation of a gas, e.g., particles that provide surface area to promote gas-gas reactions.

Additionally, while the embodiments disclosed herein are primarily described with respect to a coal-based power plant having a combustion chamber that forms part of a boiler, it is to be understood that embodiments of the invention may be applicable to any apparatus and/or methods that requires the removal of $SO_3(g)$ from a flue gas, e.g., a furnace.

Referring now to FIG. 1, a system 10 for removing $SO_3(g)$ from a flue gas is shown in accordance with an embodiment of the present invention. The system 10 includes a conduit 12 and an injector 14. In embodiments, the system 10 may further include a controller 16 having at least one processor 18 and a memory device 20, and/or one or more seed particle injectors 22 and 24. As shown in FIG. 1, in embodiments, the conduit 14 may be disposed in a power plant 26 so as to fluidly connect a combustion chamber 28 of a boiler 30 to an emission stack 32.

As will be understood, the combustion chamber 12 is operative to receive and to facilitate combustion of a fuel, e.g., a fossil fuel such as coal, oil, and/or gas, which results in the generation of heat and a flue gas. The heat from combusting the fuel may be captured and used to generate steam, e.g., via water walls in heating contact with the flue gas, which is then sent to a steam turbine generator 34 via conduit 36. The flue gas may be sent from the combustion chamber 28 to the emission stack 32 via conduit 12.

Turning now to FIG. 2, the conduit 12 is shown with portions of the boiler 30, combustion chamber 28 and emission stack 32. As will be understood, the conduit 12 defines a flow path (represented by dashed arrows 38) of the flue gas. While FIG. 2 depicts the flow path 38 as beginning at the combustion chamber 28 and terminating at an exit 40 of the emission stack 32, it will be understood that, in embodiments, the conduit 12 need not be connected to a combustion chamber or to an emission stack.

As will be appreciated, the injector 14 is operative to inject at least one gaseous state alkali-containing species, e.g., NaOH, KOH, NaCl, KCl, $Na_2CO_3$, $K_2CO_3$, $NaCH_3COO$, $KCH_3COO$ and/or other similar species, into the conduit 12 and/or flow path 38 at an injection point 42 where the temperature of the flue gas is above the condensation temperature of sulfuric acid. As will be understood, since the at least one state alkali-containing species is injected as a gas, the resulting reactions between the at least one gaseous state alkali-containing species and $SO_3(g)$ in the flue gas is a gas-gas/gas phase reaction having improved reaction times and/or stichometry over injecting the at least one state alkali-containing species as a solid.

In embodiments, the at least one gaseous state alkali-containing species may be injected into the flow path 38 with a vapor pressure below the saturation point of the at least one gaseous state alkali-containing species, i.e., the saturation vapor pressure of the at least one gaseous state alkali-containing species at the corresponding temperature of the flue gas at the injection point 42. In other words, the at least one gaseous state alkali-containing species may be injected into the flow path 38 with a vapor pressure sufficient to prevent or delay the condensation of the at least one gaseous state alkali-containing species out of the flue gas. As will be understood, however, the vapor pressure of the at least one gaseous state alkali-containing species at the injection point 42 should, in some embodiments, preferably not be significantly larger than the corresponding alkali sulfate saturation vapor pressure so as to mitigate the occurrence of instantaneous supersaturation of the alkali sulfate upon sulfation. As the resulting gas phase sulfation reaction is very fast, e.g., less-than 1.0 s (and less than 0.1 s in some embodiments), and promptly followed by supersaturation of the alkali sulfate in the gas phase, homogenous or heterogenous condensation of the alkali sulfate may occur.

As will be further appreciated, in order to selectively target $SO_3(g)$ for removal with a minimum amount of alkali-containing species, the temperature of the flue gas at the injection point 42, or shortly downstream thereof, should, in some embodiments, be less-than-or-equal-to the temperature at which the oxidation of $SO_2$ to $SO_3$ has, or nearly has, stopped due to slow kinetics, e.g., 800-900° C. in the absence of a selective catalytic converter ("SCR") catalyst. Injecting the at least one gaseous state alkali-containing species at such a temperature may also limit wall condensation in the event the flue gas contains particles. Thus, in some embodiments, the injection point 42 may be located where the temperature of the flue gas in the flow path 38 is lower than the oxidation temperature of $SO_2$ to $SO_3$. As will be understood, injecting the at least one gaseous state alkali-containing species upstream of the temperature at which the oxidation of $SO_2$ to $SO_3$ has, or nearly has, stopped may result in $SO_2$ removal in addition to $SO_3$ removal, which in turn may result in a corresponding increase in the required stochiometric ratio of alkali to $SO_3$ for the same conversion of $SO_3(g)$.

In certain applications where the particle content of the flue gas is low, the rate of condensation of alkali-sulfate can be accelerated by the injection of seed particles into the flue gas, where the seed particles are suitable for heterogenous condensation of the alkali sulfate. In such embodiments, the seed particles may have a size distribution of about 1-10 microns and/or no larger than about 40 microns, and with the concentration varying depending on how well the seed particles mix into the flue gas. As will be understood, in embodiments, the seed particles may be injected into the flow path 38 downstream of the injection point 42 of the at least one gaseous state alkali-containing species, e.g., via seed particle injector 24. As will be appreciated, however, some embodiments of the present invention may inject seed particles into the flow path 38 at the injection point 42 via the injector 14 and/or upstream of the injection point 42 via seed particle injector 22.

Accordingly, in an embodiment where the combustion chamber 28 burns a sulfur-containing coal with a significant amount of ash and high iron content, but with a low alkali and alkali-earth metal content, and in the absence of an SCR in the flow path 38, condensation of sulfuric acid is expected to occur at about 150-200° C., e.g., in an air pre-heater. In such a scenario, the expected temperature at which $SO_2$ no longer oxidizes is about 750-900° C. Thus, the injection point 42 of the at least one gaseous state alkali-containing species should, in some embodiments, be in a superheater section of a boiler having a temperature range of about 1500° F. to about 2400° F., e.g., the cooler section and/or the outlet of the superheater. At these high injection temperatures, the selection of alkali-containing species is not limited by their saturation vapor pressure, and therefore, the choice of the alkali may be driven primarily by economics, as opposed to solely based on chemistry.

For example, sodium acetate, which has a melting point of about 550° C. can be selected as the at least one gaseous state alkali-containing species where it is dissolved in aqueous form and gasified prior to injection. As will be understood, in embodiments, while the stochiometric ratio of $NaCH_3COO$ to $SO_3(g)$ may depend on the flue gas composition, e.g., particle content, halide content, etc., the conditions within a flue gas are often favorable to the formation of submicron particles of sodium sulfate, which has a demonstrated stochiometric ratio of Na:S of approximately two (2.0). Thus, the selectivity of Na towards $SO_3$ may be very high, e.g., close to or at the theoretical stoichiometric ratios due to the targeting of the gas-gas reaction to anti-sublimation (solid formation). In such embodiments, there may be little or no need to inject seed particles into the flow path 38 as the flue gas may already have a sufficient amount of particles to facilitate condensation due to fly ash.

Finally, it is to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be executed in real-time. For example, as stated above, the system 10 may include at least one processor 18 and system memory/data storage structures 20 in the form of a controller, e.g., controller 16, that electrically communicates with one or more of the components of the system 10, e.g., the injectors 14, 22 and/or 24. The memory may include random access memory ("RAM") and read-only memory ("ROM"). The at least one processor may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that provides for control over one or more of the various components of the system 10 may be read into a main memory of the at least one processor from a computer-readable medium. The term "computer-readable medium," as used herein, refers to any medium that provides or participates in providing instructions to the at least one processor 18 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes the at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for removing $SO_3$ from a flue gas is provided. The system includes a conduit and an injector. The conduit is operative to define a flow path of the flue gas. The injector is operative to inject at least one gaseous state alkali-containing species into the conduit at an injection point. The temperature of the flue gas at the injection point is above the condensation temperature of sulfuric acid. In certain embodiments, the at least one gaseous state alkali-containing species is NaOH, KOH, NaCl, KCl, $Na_2CO_3$, $K_2CO_3$, $NaCH_3COO$, and/or $KCH_3COO$. In certain embodiments, the at least one gaseous state alkali-containing species reacts with $SO_3$ in a gas-gas reaction. In certain embodiments, the temperature of the flue gas at the injection point is lower than the oxidation temperature of $SO_2$ to $SO_3$. In certain embodiments, the at least one gaseous state alkali-containing species is injected into the conduit at a vapor pressure below the saturation point of the at least one gaseous state alkali-containing species. In certain embodiments, the injector is further operative to inject seed particles into the conduit. In certain embodiments, the system further includes a seed particle injector operative to inject seed particles into the conduit at or downstream of the injection point. In certain embodiments, the conduit is fluidly connected to the combustion chamber of a boiler or a furnace.

Other embodiments provide for a method for removing $SO_3$ from a flue gas. The method includes injecting at least one gaseous state alkali-containing species into a flow path of a flue gas at an injection point upstream of a region of the flow path where sulfuric acid condenses out of the flue gas. In certain embodiments, the at least one gaseous state alkali-containing species is NaOH, KOH, NaCl, KCl, $Na_2CO_3$, $K_2CO_3$, $NaCH_3COO$, and/or $KCH_3COO$. In certain embodiments, the method further includes reacting the at least one gaseous state alkali-containing species with $SO_3$ in a gas-gas reaction. In certain embodiments, the temperature of the flue gas at the injection point is lower than the oxidation temperature of $SO_2$ to $SO_3$. In certain embodiments, the at least one gaseous state alkali-containing species is injected into the flow path at a vapor pressure below the saturation point of the at least one gaseous state alkali-containing species. In certain embodiments, the method further includes injecting seed particles into the flow path. In certain embodiments, the seed particles are injected into the flow path at or downstream of the injection point. In certain embodiments, the method further includes generating the flue gas via a combustion chamber disposed in a boiler or a furnace.

Yet still other embodiments provide for a non-transitory computer readable medium including instructions. The instructions adapt at least one processor to: inject, via an injector, at least one gaseous state alkali-containing species into a conduit defining a flow path of a flue gas at an injection point upstream of a region of the flow path where sulfuric acid condenses out of the flue gas. In certain embodiments, the at least one gaseous state alkali-containing species is NaOH, KOH, NaCl, KCl, $Na_2CO_3$, $K_2CO_3$, $NaCH_3COO$, and/or $KCH_3COO$. In certain embodiments, the instructions further adapt the at least one processor to inject, via the injector or another injector, seed particles into the conduit. In certain embodiments, the at least one gaseous state alkali-containing species reacts with $SO_3$ in a gas-gas reaction.

Accordingly, by injecting at least one gaseous state alkali-containing species into a flue gas at a point upstream of the condensation temperature of sulfuric acid, some embodiments of the invention may provide for more selective removal of $SO_3$ from the flue gas, as compared to traditional approaches. Thus, some embodiments of the present invention may result in improved operating efficiencies as less reactant is required to remove a given amount of $SO_3$ as compared to traditional approaches.

Further, some embodiments of the present invention avoid the formation of sticky deposits on downstream equipment and the associated corrosion, fouling and/or plugging thereof as often happens in traditional phase change approaches such as the injection of ammonium.

Further still, by providing for controlled condensation via seed particles, some embodiments of the present invention may provide for fast temperature drops within the flue gas so as to prevent wall deposition of alkali sulfate. Further, some embodiments of the present invention may prevent or mitigate the formation of hydrates.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for removing $SO_3$ from a flue gas, the system comprising:
   a conduit operative to define a flow path of the flue gas; and
   an injector operative to inject at least one gaseous state alkali-containing species into the conduit at an injection point;
   wherein the temperature of the flue gas at the injection point is above the condensation temperature of sulfuric acid; and
   wherein the at least one gaseous state alkali-containing species is injected into the conduit at a vapor pressure below the saturation point of the at least one gaseous state alkali-containing species.

2. The system of claim 1, wherein the at least one gaseous state alkali-containing species is NaOH, KOH, NaCl, KCl, $Na_2CO_3$, $K_2CO_3$, $NaCH_3COO$, and/or $KCH_3COO$.

3. The system of claim 1, wherein the at least one gaseous state alkali-containing species reacts with $SO_3$ in a gas-gas reaction.

4. The system of claim 1, wherein the temperature of the flue gas at the injection point is lower than the oxidation temperature of $SO_2$ to $SO_3$.

5. The system of claim 1, wherein the injector is further operative to inject seed particles into the conduit.

6. The system of claim 1 further comprising a seed particle injector operative to inject seed particles into the conduit at or downstream of the injection point.

7. The system, of claim 1, wherein the conduit is fluidly connected to the combustion chamber of a boiler or a furnace.

8. A method for removing $SO_3$ from a flue gas, the method comprising:
   injecting at least one gaseous state alkali-containing species into a flow path of a flue gas at an injection point upstream of a region of the flow path where sulfuric acid condenses out of the flue gas, wherein the at least one gaseous state alkali-containing species is injected into the flow path at a vapor pressure below the saturation point of the at least one gaseous state alkali-containing species.

9. The method of claim 8, wherein the at least one gaseous state alkali-containing species is NaOH, KOH, NaCl, KCl, $Na_2CO_3$, $K_2CO_3$, $NaCH_3COO$, and/or $KCH_3COO$.

10. The method of claim 8 further comprising: reacting the at least one gaseous state alkali-containing species with $SO_3$ in a gas-gas reaction.

11. The method of claim 8, wherein the temperature of the flue gas at the injection point is lower than the oxidation temperature of SO2 to SO3.

12. The method of claim 8 further comprising: injecting seed particles into the flow path.

13. The method of claim 12, wherein the seed particles are injected into the flow path at or downstream of the injection point.

14. The method of claim 8 further comprising:
   generating the flue gas via a combustion chamber disposed in a boiler or a furnace.

15. A non-transitory computer readable medium comprising instructions that adapt at least one processor to:
   inject, via an injector, at least one gaseous state alkali-containing species into a conduit defining a flow path of a flue gas at an injection point upstream of a region of the flow path where sulfuric acid condenses out of the flue gas.

16. The non-transitory computer readable medium of claim 15, wherein the at least one gaseous state alkali-containing species is NaOH, KOH, NaCl, KCl, $Na_2CO_3$, $K_2CO_3$, $NaCH_3COO$, and/or $KCH_3COO$.

17. The non-transitory computer readable medium of claim 15, wherein the instructions further adapt the at least one processor to:

inject, via the injector or another injector, seed particles into the conduit.

18. The non-transitory computer readable medium of claim 15, wherein the at least one gaseous state alkali-containing species reacts with $SO_3$ in a gas-gas reaction.

* * * * *